United States Patent Office 2,867,622
Patented Jan. 6, 1959

2,867,622

ESTERS OF RESERPIC ACID

Robert Armistead Lucas, Mendham, N. J., assignor to Ciba Pharmaceutical Products, Inc., Summit, N. J., a corporation of New Jersey No Drawing. Application June 4, 1957
Serial No. 663,349

14 Claims. (Cl. 260—287)

The present invention relates to a new series of diesters of reserpic acid and the salts of such esters.

Reserpine, an alkaloid isolated from plant material of Rauwolfia species such as, for example, *Rauwolfia serpentina*, *Rauwolfia vomitoria*, *Rauwolfia canescens*, etc., which shows a pronounced hypotensive action and a strong sedative effect and is widely distributed as a medicinal agent, was found to be a diester of a hydroxy acid containing the indole portion as part of a pentacyclic molecule. (Dorfman et al., Helv. Chim. Acta, vol. 37, page 59 (1954).) Upon mild hydrolysis of reserpine, for example, methanolysis with sodium methylate in methanol as described in U. S. Patent No. 2,786,844 by MacPhillamy and Huebner, issued March 26, 1957, 3,4,5-trimethoxy-benzoic acid is split off and the methyl reserpate of the formula:

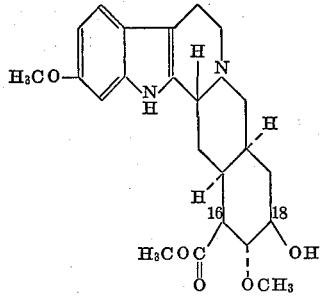

is isolated. The latter may be further hydrolyzed by treatment with strong alkali e. g. sodium hydroxide, to reserpic acid, which may also be produced directly by treating reserpine with such a strong alkali. According to the mentioned publication by Dorfman et al. it has been found that reserpic acid and/or methyl reserpate may be esterified to produce synthetic diesters of reserpic acid.

The new series of diesters of reserpic acid of this invention are methyl 18-O-esterified reserpates which may be depicted by the formula:

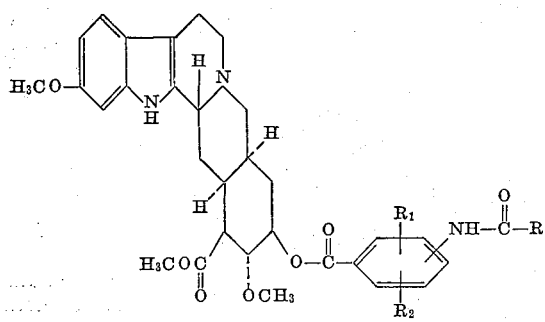

in which R stands for lower alkyl or lower alkoxy, $R_1$ represents hydrogen, lower alkoxy, lower alkyl-carbonylamino, lower alkoxy-carbonylamino, lower alkyl-carbonyloxy or lower alkoxy-carbonyloxy and $R_2$ for hydrogen, lower alkoxy, lower alkyl-carbonyloxy or lower alkoxy-carbonyloxy. Lower alkyl radicals, also those of lower alkoxy, lower alkyl-carbonyl or lower alkoxy-carbonyl radicals contain from 1 to 7 carbon atoms and are represented by propyl, isopropyl or butyl, but especially by methyl or ethyl.

Salts of the new diesters are therapeutically useful acid addition salts, especially those with inorganic acids such as, for example, with hydrochloric, hydrobromic, sulfuric, phosphoric or thiocyanic acid; or with organic acids such as for example, acetic, propionic, succinic, maleic, malic, citric, tartaric acid and the like.

The new diesters of this invention and their salts show a pronounced sedative and tranquilizing effect as does reserpine. However, animal tests show that the action is very much prolonged and the animals recover from larger doses than they do from reserpine. Furthermore the hypotensive activity found in reserpine is almost absent from the new series of diesters described herein. Therefore, these new esters may be used as tranquilizing agents with a prolonged action coupled with a faster recovery of the body from drug effects as compared with reserpine and without the secondary hypotensive action of the latter. Especially valuable with respect to these effects are those diesters in which the 18-hydroxyl group of methyl reserpate is esterified with a lower alkoxy carbonylamino-benzoic acid. Representative of this group is the compound of the formula:

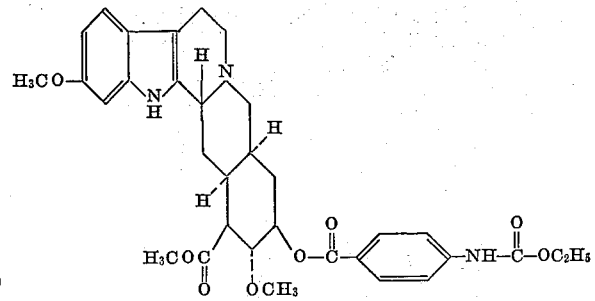

The new esters of this invention may be prepared by treating methyl reserpate or a salt thereof with a derivative of a benzoic acid of the formula:

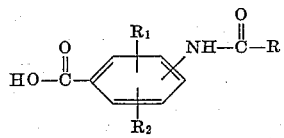

in which R, $R_1$ and $R_2$ have the meaning given above, capable of forming the ester linkage of such an acid with the 18-hydroxy group of methyl reserpate and, if necessary, re-esterifying any free amino and/or hydroxyl group formed by hydrolysis, and/or, if desired, converting any resulting salt into the free base, and/or converting any free base obtained into the salt.

Salts of the methyl reserpate used as starting materials are especially acid addition salts such as those with inorganic acids or organic acids e. g. those outlined hereinbefore.

Derivatives of benzoic acids as outlined above capable of forming an ester linkage of the acyl residue of these benzoic acids with the 18-hydroxy group of methyl reserpate, are especially the halides of such acids, e. g. chlorides or bromides; or the anhydrides thereof. Furthermore, esters of such benzoic acids with alkanols e. g. methanol, ethanol, propanol or isopropanol may be used in a transesterification reaction with formation of the desired methyl reserpate ester by splitting of the alkanol.

The reaction is preferably carried out in the presence of an acid neutralizing agent, especially a liquid organic base such as, for example, a monocyclic nitrogen heterocycle e. g. pyridine, collidine or lutidine. Such organic bases may be replaced by inorganic bases such as alkali metal hydroxides, e. g. sodium or potassium hydroxide; or inorganic salts such as alkali metal carbonates, e. g. sodium carbonate or potassium hydrogen carbonate.

The esterification may be performed in an inert organic diluent such as an aromatic hydrocarbon e. g. benzene or toluene; or an aliphatic hydrocarbon e. g. pentane or hexane; or mixtures of such solvents. Instead of using an inert solvent, the liquid organic bases mentioned hereinbefore may be used simultaneously as diluents and acid neutralizing agents. A preferred diluent for such an esterification reaction is, for example, anhydrous pyridine. If necessary, the reaction may be performed at an elevated temperature; however at temperatures ranging from −10° C. to room temperatures, the highest yields are obtained. Instead of working at atmospheric pressure the esterification may be performed in a closed vessel under pressure, and, furthermore, an inert gas, such as nitrogen, may be used to avoid any contact with atmospheric oxygen.

During the reaction esterified amino and/or hydroxyl groups may be hydrolyzed. These groups may be re-esterified for example under the esterification conditions outlined hereinbefore. Preferably halides e. g. chlorides, of lower alkanoic acids e. g. acetyl chloride, or lower alkyl halogeno-carbonates, e. g. ethyl chlorocarbonate may be used as reesterification agents in the presence of a liquid organic base, preferably pyridine.

The invention also comprises any modification of the general process wherein a compound which may be obtained as an intermediate at any stage of the process is used as starting material and the remaining step(s) of the process is (are) carried out.

The invention therefore also includes the process for the preparation of the diesters of this invention which comprises acylating in compounds of the formula:

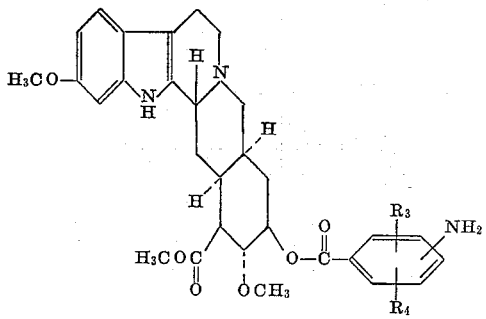

in which $R_3$ stands for hydrogen, hydroxyl, lower alkoxy, lower alkyl-carbonyloxy, lower alkoxy-carbonyloxy or amino and $R_4$ for hydrogen, hydroxyl, lower alkoxy, lower alkyl-carbonyloxy or lower alkoxy-carbonyloxy, or salts of such compounds, the free amino group and, if any, the free hydroxyl groups, so as to produce the diesters of reserpic acid outlined hereinbefore. Such acylation may be carried out according to the above outlined procedure, i. e. the acid halides such as lower alkane carboxylic acid halides e. g. acetylchloride, or lower alkyl halogenocarbonates e. g. ethyl chlorocarbonate may be reacted with the methyl 18-O-benzoyl-reserpate, the benzoyl group of which contains free amino groups, in the presence of a liquid organic base, e. g. pyridine, or an alkali metal carbonate e. g. sodium carbonate, and, in the absence or presence of an additional solvent such as an aromatic hydrocarbon e. g. benzene or toluene.

The invention therefore also comprises the acylation of any free hydroxyl groups attached to the benzoyl portion of methyl 18-O-amino-substituted benzoyl-reserpate either by a separate or combined acylation together with any free amino groups. Thus, for example, an amino-hydroxy-benzoyl derivative may be converted into an acylamino-acylhydroxy-benzoyl derivative by reaction with an acyl halide, e. g. acetylchloride or ethyl chlorocarbonate, according to the above outlined procedure. Alternatively, an acylamino-hydroxy-benzoyl may be esterified to the bis-acylated product according to the same procedure.

Depending on the conditions used the new compounds are obtained in the form of the free bases or salts thereof. Salts may be converted into free bases by reaction with an alkaline reagent which does not hydrolize the ester groups, such as, for example, silver carbonate. Free bases may be transformed into their therapeutically useful acid addition salts by reaction with appropriate inorganic or organic acids, such as, the acids outlined above, for example, in an alcoholic e. g. methanolic or ethanolic solution.

The derivatives of the benzoic acids used as starting materials in the process of this invention are known or may be prepared according to methods used for the preparation of analogous derivatives. Thus, for example, acid halides may be prepared by reacting the free benzoic acid with a thionyl halide, e. g. thionyl chloride; the halide e. g. chloride thus formed is preferably used immediately. Or, methyl 18-O-amino-substituted benzoyl-reserpates may be obtained from the corresponding nitro derivatives by hydrogenation, especially in the presence of a catalyst, e. g. palladium.

The following examples are intended to illustrate the invention. They are not to be construed as being limitations thereon. Temperatures are given in degrees centigrade.

*Example 1*

A mixture of 0.5 g. of methyl 18-O-(4-aminobenzyl)-reserpate, 2.5 ml. of ethyl chlorocarbonate and 2.5 ml. of pyridine in 50 ml. of benzene is refluxed for 10 minutes, the solvents evaporated under reduced pressure and the residue dissolved in chloroform. After washing the organic solution with three portions of 100 ml. of 2 N aqueous potassium hydroxide and with water, and drying over sodium sulfate, the chloroform is evaporated and the residue crystallized from a mixture of ethyl acetate and petroleum ether. The gel-like solid is filtered, and dried to a tan powder; the methyl 18-O-(4-carbethoxy-amino-benzoyl)-reserpate melts at 176–178°.

The methyl 18-O-(4-aminobenzoyl)-reserpate used as the starting material may be prepared as follows: 5 g. of methyl reserpate, 15 g. of 4-nitrobenzyl chloride and 38 ml. of pyridine are mixed under cooling and kept at 5° for three days. A mixture of ice and water is added and the solution extracted with 350 ml. of chloroform; the separated organic layer is washed three times with aqueous potassium hydroxide (of 3 percent strength), twice with a saturated aqueous sodium chloride solution and then dried over sodium sulfate. The solvent is evaporated under reduced pressure, ether is added to the residue and a brown powder is formed. The methyl 18-O-(4-nitrobenzoyl)-reserpate is recrystallized from a mixture of ethanol and methylene chloride, M. P. 230–235°.

A solution of 1.1 g. of methyl 18-O-(4-nitro-benzoyl)-reserpate in 50 ml. of methanol is hydrogenated in the presence of 0.1 g. of 10 percent palladium on charcoal; the hydrogenation solution is filtered, the solvent evaporated from the filtrate under reduced pressure. The residue is recrystallized from a mixture of ethyl acetate and petroleum ether and 0.5 g. of the methyl 18-O-(4-amino-benzoyl)-reserpate is obtained as a yellow powder, M. P. 208–212.

*Example 2*

A mixture of 25 g. of 4-acetylaminobenzoic acid and 70 ml. of thionylchloride is refluxed for one-half hour on the steam bath. After evaporation of the excess of thionylchloride under reduced pressure and storage over phosphorus pentoxide and silica gel in the desiccator, the acid chloride is used directly in the next step.

8 g. of methyl reserpate and the 4-acetylamino-benzoyl chloride described above are kept in 60 ml. of pyridine at 5° for three days. The solvent is evaporated under reduced pressure at a temperature of less than 50° and the residue is dissolved in chloroform. The chloroform layer is washed three times with aqueous hydrochloric acid (of 2 percent strength), once with water, three times with aqueous potassium hydroxide (of 2 percent strength) and twice with water, and then dried over sodium sulfate. The solvent is evaporated under reduced pressure and the methyl 18-O-(4-acetylamino benzoyl)-reserpate crystallized from a mixture of ethanol and ether.

What is claimed is:

1. A member of the group consisting of esters of methyl reserpate of the formula:

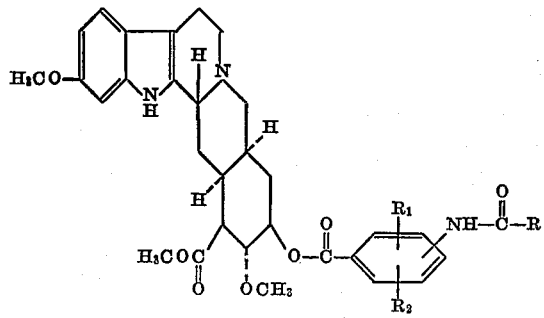

in which R stands for a member of the group consisting of lower alkyl and lower alkoxy, $R_1$ for a member of the group consisting of hydrogen, lower alkoxy, lower alkyl-carbonyloxy, lower alkoxy-carbonyloxy, lower alkyl-carbonylamino and lower alkoxy-carbonylamino and $R_2$ for a member of the group consisting of hydrogen, lower alkoxy, lower alkyl-carbonyloxy and lower alkoxy-carbonyloxy, and therapeutically useful salts thereof.

2. Methyl 18-O-lower alkoxy-carbonylamino-benzoyl-reserpate.

3. Methyl 18-O-(4-carbethoxyamino-benzoyl)-reserpate.

4. Methyl 18-O-(4-acetylamino-benzoyl)-reserpate.

5. Process for the preparation of a member of the group consisting of esters of methyl reserpate of the formula:

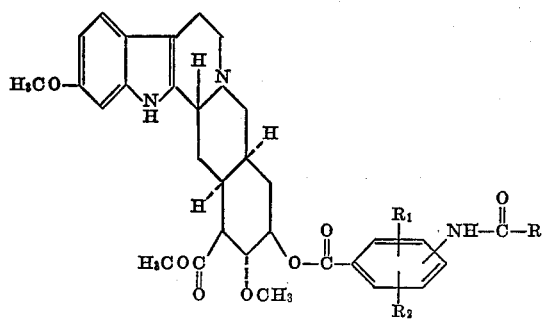

in which R stands for a member of the group consisting of lower alkyl and lower alkoxy, $R_1$ for a member of the group consisting of hydrogen, lower alkoxy, lower alkyl-carbonyloxy, lower alkoxy-carbonyloxy, lower alkyl-carbonylamino and lower alkoxy-carbonylamino and $R_2$ for a member of the group consisting of hydrogen, lower alkoxy, lower alkyl-carbonyloxy and lower alkoxy-carbonyloxy, and salts thereof, which comprises treating a member of the group consisting of methyl reserpate and a salt thereof with a derivative of a benzoic acid of the formula:

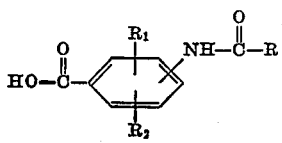

in which R, $R_1$ and $R_2$ have the above meaning, capable of forming an ester linkage of such an acid with the 18-hydroxyl group of methyl reserpate.

6. Process according to claim 5, wherein a member of the group consisting of an acid halide, an anhydride and a lower alkyl ester is used as the derivative of a benzoic acid.

7. Process according to claim 5 wherein the acid chloride is used as the derivative of a benzoic acid.

8. Process according to claim 5, wherein the reaction is carried out in the presence of a liquid organic base.

9. Process according to claim 5, wherein the reaction is carried out in the presence of pyridine.

10. In a process for the preparation of a member of the group consisting of esters of methyl reserpate of the formula:

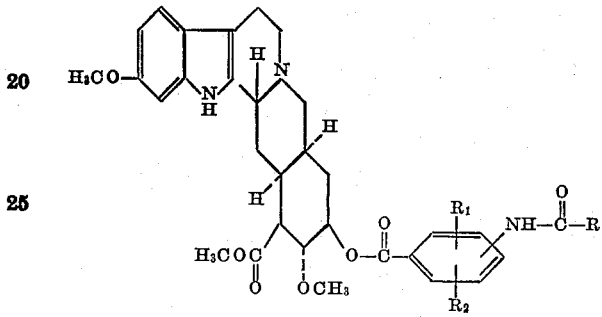

in which R stands for a member of the group consisting of lower alkyl and lower alkoxy, $R_1$ for a member of the group consisting of hydrogen, lower alkoxy, lower alkyl-carbonyloxy, lower alkoxy-carbonyloxy, lower alkyl-carbonylamino and lower alkoxy-carbonylamino and $R_2$ for a member of the group consisting of hydrogen, lower alkoxy, lower alkyl-carbonyloxy and lower alkoxy-carbonyloxy, and salts thereof the step which comprises treating in a member of the group consisting of esters of methyl reserpates of the formula:

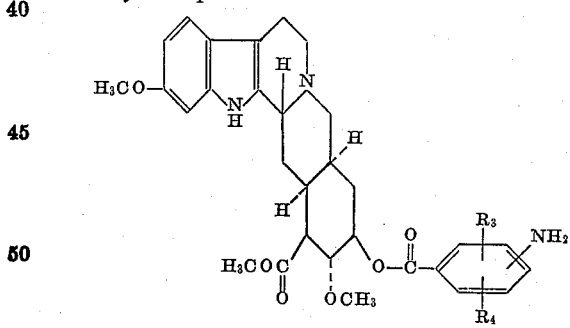

in which $R_3$ stands for a member of the group consisting of hydrogen, hydroxyl, lower alkoxy, lower alkyl-carbonyloxy, lower alkoxy-carbonyloxy and amino, and $R_4$ for a member of the group consisting of hydrogen, hydroxyl, lower alkoxy, lower alkyl-carbonyloxy and lower alkoxy-carbonyloxy, and salts thereof, the free amino and hydroxyl groups with acid halides selected from the group consisting of lower alkane-carboxylic acid halides and lower alkyl halogenocarbonates to form the acylated derivatives.

11. Process according to claim 10, wherein acid chlorides are used as the acylating agents.

12. Process according to claim 10, wherein the mixture of a liquid organic base and an aromatic hydrocarbon is used as the diluent.

13. Process according to claim 10, wherein the mixture of pyridine and benzene is used as the diluent.

14. Process for the preparation of methyl 18-O-(4-carbethoxyamino-benzoyl)-reserpate which comprises treating methyl 18-O-(4-amino-benzoyl)-reserpate with ethyl chloro-carbonate.

No references cited.

UNITED STATES PATENT OFFICE
CERTIFICATE OF CORRECTION

Patent No. 2,867,622                                              January 6, 1959

Robert Armistead Lucas

It is hereby certified that error appears in the printed specification of the above numbered patent requiring correction and that the said Letters Patent should read as corrected below.

Column 4, line 34, for "-(4-aminobenzyl)-" read -- -(4-aminobenzoyl)- --; line 48, for "4-nitrobenzyl" read -- 4-nitrobenzoyl --.

Signed and sealed this 9th day of June 1959.

(SEAL)
Attest:

KARL H. AXLINE                                            ROBERT C. WATSON
Attesting Officer                                        Commissioner of Patents